(12) United States Patent
Byun et al.

(10) Patent No.: US 9,054,547 B2
(45) Date of Patent: Jun. 9, 2015

(54) COMMUNICATION METHOD AND APPARATUS IN WIRELESS RECHARGING SYSTEM

(75) Inventors: Kang-Ho Byun, Gyeonggi-do (KR); Se-Ho Park, Gyeonggi-do (KR); Kyung-Woo Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 223 days.

(21) Appl. No.: 13/604,000

(22) Filed: Sep. 5, 2012

(65) Prior Publication Data

US 2013/0065518 A1 Mar. 14, 2013

Related U.S. Application Data

(60) Provisional application No. 61/531,343, filed on Sep. 6, 2011, provisional application No. 61/532,404, filed on Sep. 8, 2011.

(30) Foreign Application Priority Data

Jul. 30, 2012 (KR) ........................ 10-2012-0083440

(51) Int. Cl.
*H04B 7/24* (2006.01)
*H04B 5/00* (2006.01)
*H04M 1/00* (2006.01)
*H02J 5/00* (2006.01)

(52) U.S. Cl.
CPC ...................................... *H02J 5/005* (2013.01)

(58) Field of Classification Search
USPC .......... 455/39, 41.1, 41.2, 572, 573; 320/108; 307/104
See application file for complete search history.

(56) References Cited

U.S. PATENT DOCUMENTS

| | | | | |
|---|---|---|---|---|
| 6,175,739 | B1 * | 1/2001 | Ishii et al. | 455/452.1 |
| 8,410,637 | B2 * | 4/2013 | Karaoguz et al. | 307/104 |
| 8,618,697 | B2 * | 12/2013 | Karaoguz et al. | 307/104 |
| 8,716,977 | B2 * | 5/2014 | Walley et al. | 320/108 |
| 2012/0309308 | A1 * | 12/2012 | Kim et al. | 455/41.1 |

* cited by examiner

*Primary Examiner* — Quochien B Vuong
(74) *Attorney, Agent, or Firm* — The Farrell Law Firm, P.C.

(57) ABSTRACT

A method of performing communication between a wireless power transmitter and a wireless power receiver, which includes performing load detection by detecting wireless power provided by the wireless power transmitter being applied to the wireless power receiver; setting up a common channel having a predetermined first frequency for establishing a connection with the wireless power receiver, which is performed by the wireless power transmitter; establishing the connection with the wireless power receiver using the common channel; determining, from among available channels, a selection channel having an optimal condition for communicating with the wireless power receiver and a predetermined second frequency through use of the common channel; and performing data transmission and reception with the wireless power receiver through the selection channel.

16 Claims, 6 Drawing Sheets

COMMUNICATION METHOD AND APPARATUS IN WIRELESS RECHARGING SYSTEM

PRIORITY

This application claims priority under 35 U.S.C. §119(a) to U.S. Provisional Patent Application No. 61/531,343 filed on Sep. 6, 2011, and U.S. Provisional Patent Application No. 61/532,404 filed on Sep. 8, 2011, and a Korean Patent Application filed in the Korean Intellectual Property Office on Jul. 30, 2012 and assigned Serial No. 10-2012-0083440, the entire contents of each of which are incorporated herein by reference.

BACKGROUND OF THE INVENTION

1. Field of the Invention

The present invention relates generally to a method and apparatus for wireless recharging, and more particularly, to a communication technology applied in a procedure of wireless recharging.

2. Description of the Related Art

Figure 1:
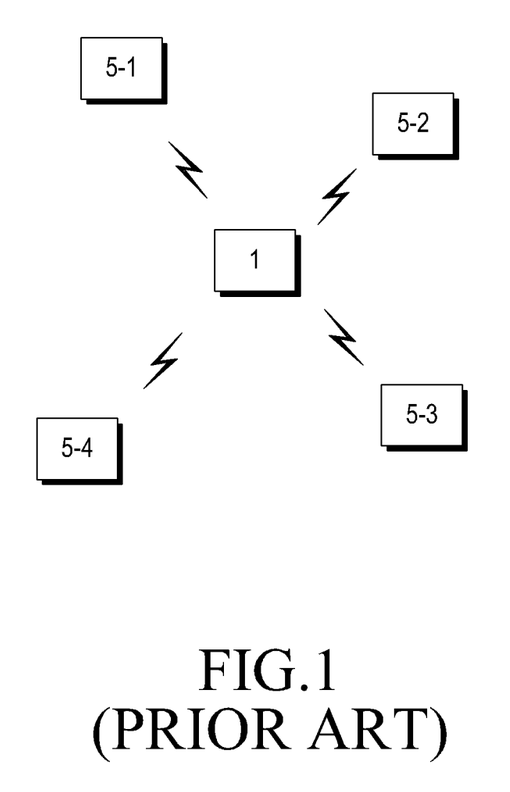
FIG. 1 is a diagram illustrating a general multiple wireless power transmission system.

FIG. 1 is a diagram illustrating a general multiple wireless power transmission system. The multiple wireless power transmission system includes a wireless power receiver 1 and wireless power transmitters 5-1, 5-2, 5-3, and 5-4. The wireless power receiver 1 is configured to be able to receive wireless power from the at least one of the wireless power transmitters 5-1, 5-2, 5-3, and 5-4.

To implement the multiple wireless power transmission system, the wireless power receiver 1 must select at least one of the wireless power transmitters 5-1, 5-2, 5-3, and 5-4 to provide power to the wireless power receiver 1, and controls the wireless power transmission. The selection of the at least one wireless power transmitter and control of the wireless power transmission are performed through communication between the wireless power receiver 1 and the selected at least one wireless power transmitter.

SUMMARY OF THE INVENTION

The present invention provides a communication method and apparatus that enables quick and efficient communications between a wireless power receiver and a plurality of wireless power transmitters included in a multiple wireless power transmission system environment.

In accordance with one aspect of the present invention, a method of performing communication between a wireless power transmitter and a wireless power receiver is provided. The method includes performing load detection by detecting wireless power provided by the wireless power transmitter being applied to the wireless power receiver; setting up a common channel having a predetermined first frequency for establishing a connection with the wireless power receiver, which is performed by the wireless power transmitter; establishing the connection with the wireless power receiver using the common channel; determining, from among available channels, a selection channel having an optimal condition for communicating with the wireless power receiver and a predetermined second frequency through use of the common channel; and performing data transmission and reception with the wireless power receiver through the selection channel.

In accordance with another aspect of the present invention, a method of performing communication between a wireless power transmitter and a wireless power receiver is provided. The method includes supplying wireless power received from the wireless power transmitter to the wireless power receiver; setting up a common channel having a predetermined first frequency for establishing a connection with the wireless power transmitter; establishing the connection with the wireless power transmitter using the common channel; determining, from among available channels, a selection channel having an optimal condition for communicating with the wireless power transmitter and a predetermined second frequency through use of the common channel; and performing data transmission and reception with the wireless power transmitter through the selection channel.

In accordance with another aspect of the present invention, a wireless power transmitter for wirelessly transmitting power is provided. The wireless power transmitter includes a power supply for supplying power; a resonator for creating a Radio Frequency (RF) field and wirelessly providing the supplied power through the RF field to a wireless receiver; a sensor unit for detecting a change in power provided by the resonator and informing a controller of whether the wireless power receiver is receiving the power; a communication unit for communicating with the wireless power receiver through a common channel having a predetermined first frequency and a selection channel having a predetermined second frequency; and the controller for controlling the communication unit to set up the common channel in response to a confirmation that the wireless power receiver is receiving the power, determining the selection channel using transmitted/received data on the common channel, and controlling the communication unit to set up the selection channel.

In accordance with another aspect of the present invention, a wireless power receiver for wirelessly receiving power is provided. The wireless power receiver includes a resonator for receiving a Radio Frequency (RF) field provided by a wireless power transmitter; a power converter for converting the RF field received by the resonator into power useable by the wireless power receiver; a communication unit for communicating with the wireless power transmitter through a common channel having a predetermined first frequency and a selection channel having a predetermined second frequency; and a controller for controlling the communication unit to set up the common channel, determining the selection channel, using transmitted/received data on the common channel, and controlling setup of the selection channel.

BRIEF DESCRIPTION OF THE DRAWINGS

The above and other aspects, features, and advantages of the present invention will become more apparent from the following detailed when taken in conjunction with the accompanying drawings in which.

DETAILED DESCRIPTION OF EMBODIMENTS OF THE PRESENT INVENTION

Embodiments of the present invention are described in detail as follows with reference to the accompanying drawings. In the drawings, like reference numerals may refer to the same or similar elements. Descriptions of some well-known technologies may be omitted to avoid obscuring subject matter of the present invention.

It will be understood that although the terms first and second are used herein to distinguish various elements, these elements should not otherwise be limited by these terms. For example, a first element discussed herein may also be referred to as a second element, and similarly, a second element may be referred to as a first element, while remaining in accordance with embodiments of the present invention.

Figure 2:
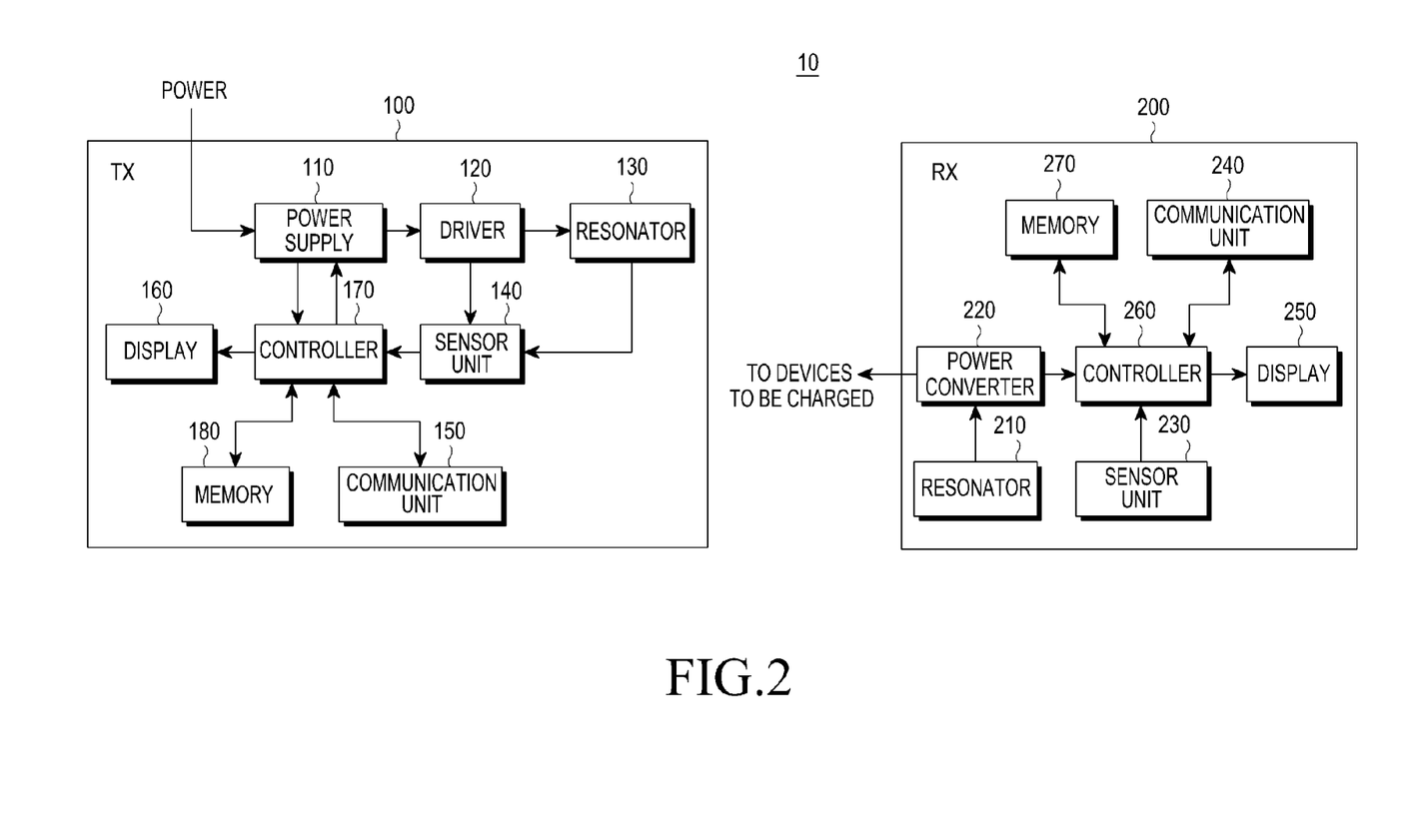
FIG. 2 is a block diagram illustrating a wireless recharging system in which a wireless recharging communication method according to an embodiment of the present invention.

FIG. 2 is a block diagram illustrating a wireless recharging system in for performing a wireless recharging communication method according to an embodiment of the present invention.

Referring to FIG. 2, the wireless recharging system 10 includes a power transmitter (TX) 100 and a power receiver (RX) 200. The TX 100 includes a power supply 110, a driver 120, a first resonator 130, a first sensor unit 140, a first communication unit 150, a first display 160, a first controller 170, and a first memory 180.

The power supply 110 is connected to an external power source, outputs a signal indicating a connection state with respect to the external power source (e.g., on/off, applied voltage, etc.), and supplies the driver 120 with power (voltage and/or current) under a control of the first controller 170. Alternatively, the power supply 110 may supply the driver 120 with a predetermined level of power.

The driver 120 converts or adjusts the power supplied by the power supply 110 under the control of the first controller 170 to generate a drive signal for the first resonator 130, and outputs the generated drive signal to the first resonator 130. The drive signal may be in the form of pulses, sine waves, etc., that have a constant frequency.

The first resonator 130 generates a Radio Frequency (RF) field, and may have a flat board shape. Field strengths of the generated RF fields may be uniformly distributed on a surface of the first resonator 130, or may be weakly distributed around a central part of the first resonator 130, while being strongly distributed in surrounding areas.

The driver 120 and the first resonator 130 are configured to be able to transmit power wirelessly in at least one of various wireless recharging methods, such as a resonance method or an electromagnetic induction method.

The first sensor unit 140 detects whether the power receiver 200 is located within a rechargeable area of the first resonator 130, and outputs the detection result to the first controller 170. The first sensor unit 140 measures a change in a load impedance in the driver 120, a first resonator's 130 output (e.g., a resonant frequency, a magnetic energy, etc.), or a signal of the driver 120 or the first resonator 130 varying with a change in the RF field (e.g., a change in cyclic pulses provided for the first resonator 130), determines that the power receiver 200 is located within the rechargeable area when an extent of the change is above a preset threshold, and outputs the determination result to the first controller 170. Alternatively, the first sensor unit 140 may output, to the first controller 170, a value of the load impedance, a value of a resonant frequency or other signal value, or information of the extent of the change, and the first controller 170 may determine that the power receiver 200 is located within the rechargeable area when the extent of the change is above a preset threshold.

The first communication unit 150 wirelessly transmits a downward data signal input from the first controller 170 to the power receiver 200, and outputs an upward data signal wirelessly received from the power receiver 200 to the first controller 170. Each of the downward and upward data signals is included within a message, packet, or frame format that basically includes a header and a payload. Each data signal includes information for wireless recharging. The first communication unit 150 may be an out-band communication device (or module) using an external frequency instead of a frequency used in power transmission, such as in Zigbee, Near-Field Communication (NFC), Bluetooth, WiFi, or Radio-Frequency Identification (RFID), or may be an in-band communication device used to communicate by modulating the frequency used in the power transmission.

The first communication unit 150 is communicates using a common channel and a selection channel. A channel to be used in data transmission/reception is switched between the common channel and the selection channel as necessary. The first communication unit 150 performs switching between the common channel and the selection channel under control of the first controller 170.

The first display 160 displays a power transmission state, a recharging state, an error condition, the number of power receivers being recharged, etc. to a user under control of the first controller 170. The first display 160 may include a touch screen, a Liquid Crystal Display (LCD), a light emitting diode (LED) array, etc.

The first controller 170 adjusts transmission power to be transmitted to the power receiver 200 through the first resonator 130 by controlling the driver 120 (and the power supply 110) based on information received from the first sensor unit 140, information obtained through communication with the power receiver 200, etc., and performs general functions or operations by controlling other components in the power transmitter 100. These general functions and operations are described in further detail herein below. The first controller 170 switches a channel to be used in the communication of the first communication unit 150 between the common channel and the selection channel.

The first memory 180 stores recharging-related information to be transmitted to the power receiver 200, information received from the power receiver 200, a database of identification information of rechargeable power receivers, etc. The first memory 180 may be a Non-Volatile Memory (NVM), such as a Solid State Disk (SSD), a flash memory card, a Read-Only Memory (ROM), etc., or may be a volatile memory, such as a Random Access Memory (RAM).

The power receiver 200 includes a second resonator 210, a power converter 220, a second sensor unit 230, a second communication unit 240, a second display 250, a second controller 260, and a second memory 270.

The second resonator 210 generates a power signal based on an RF field generated by the power transmitter 100. More specifically, when the second resonator 210 is located within the RF field generated by the first resonator 130, and the second resonator 210 generates power by absorbing electromagnetic energy generated in the RF field.

The power converter 220 is connected to a target device (e.g., a portable communication device, such as a cell phone, a Personal Digital Assistant (PDA), a Portable Multimedia Player (PMP), a Motion Picture Experts' Group (MPEG)

Audio Layer-3 (MP3) player) to be recharged, converts the power signal to a charging voltage for charging the target device, and applies the charging voltage to the target device. The power converter 220 outputs a signal that indicates a recharging state of the target device to the second controller 260.

The second sensor unit 230 detects whether the power receiver 200 is located within the rechargeable area of the first resonator 130, and outputs the detection result to the second controller 260. The second sensor unit 230 measures a change in the second resonator's 210 output (e.g., a resonant frequency, magnetic energy, etc.), determines that the second resonator 210 of the power receiver 200 is located within the rechargeable area if the value of the change is above a preset threshold, and sends the determination result to the second controller 260. Alternatively, the second sensor unit 230 may output, to the second controller 260, the value of the resonant frequency or the value of the second resonator's 210 output, or information of an extent of the change, and then the second controller 260 may determine that the power receiver 200 is located within the rechargeable area if the extent of the change of a signal subject to be measured is above a preset threshold.

The second communication unit 240 wirelessly transmits an upward data signal input from the second controller 260 to the power transmitter 100, and outputs a downward data signal wirelessly received from the power transmitter 100 to the second controller 260. Each data signal represents information for wireless recharging. The second communication unit 240 is able operate in a communication scheme (including a frequency used, a protocol, etc.) corresponding to a communication scheme of the first communication unit 150. The communication scheme of the first and second communication units 150 and 240 may be mutually agreed upon, and notified or selected by the first communication unit 150, or preset in advance.

The second communication unit 240 is communicates using a common channel and a selection channel, and a channel to be used in data transmission/reception is switched between the common channel and the selection channel as necessary. The second communication unit 240 performs switching between the common channel and the selection channel under a control of the second controller 260.

The second display 250 displays a recharging state, an error condition, etc., to a user under control of the second controller 260. The second display 250 may include a touch screen, an LCD, an LED array, etc.

The second controller 260 recharges the target device based on information received from the second sensor unit 230, information obtained through communication with the power transmitter 100, etc., and transmits information about the power requested via the second communication unit 240 to the power transmitter 100. The second controller 260 performs general functions or operations, by controlling other components in the power receiver 200.

The second controller 260 controls a channel to be used in communication of the second communication unit 240 to be switched between the common channel and the selection channel.

The second memory 270 stores information to be transmitted to the power transmitter 100 for recharging, information received from the power transmitter 100, etc. The second memory 270 may be a non-volatile memory, volatile memory, etc.

A communication method according to an embodiment of the present invention is described as follows with reference to FIGS. 3 and 4, by explaining operations of the wireless recharging system to which the communication method is applied, from the perspective of the first controller 170 included in the power transmitter (TX) 100 and the second controller 260 included in the power receiver (RX) 200.

Figure 3:
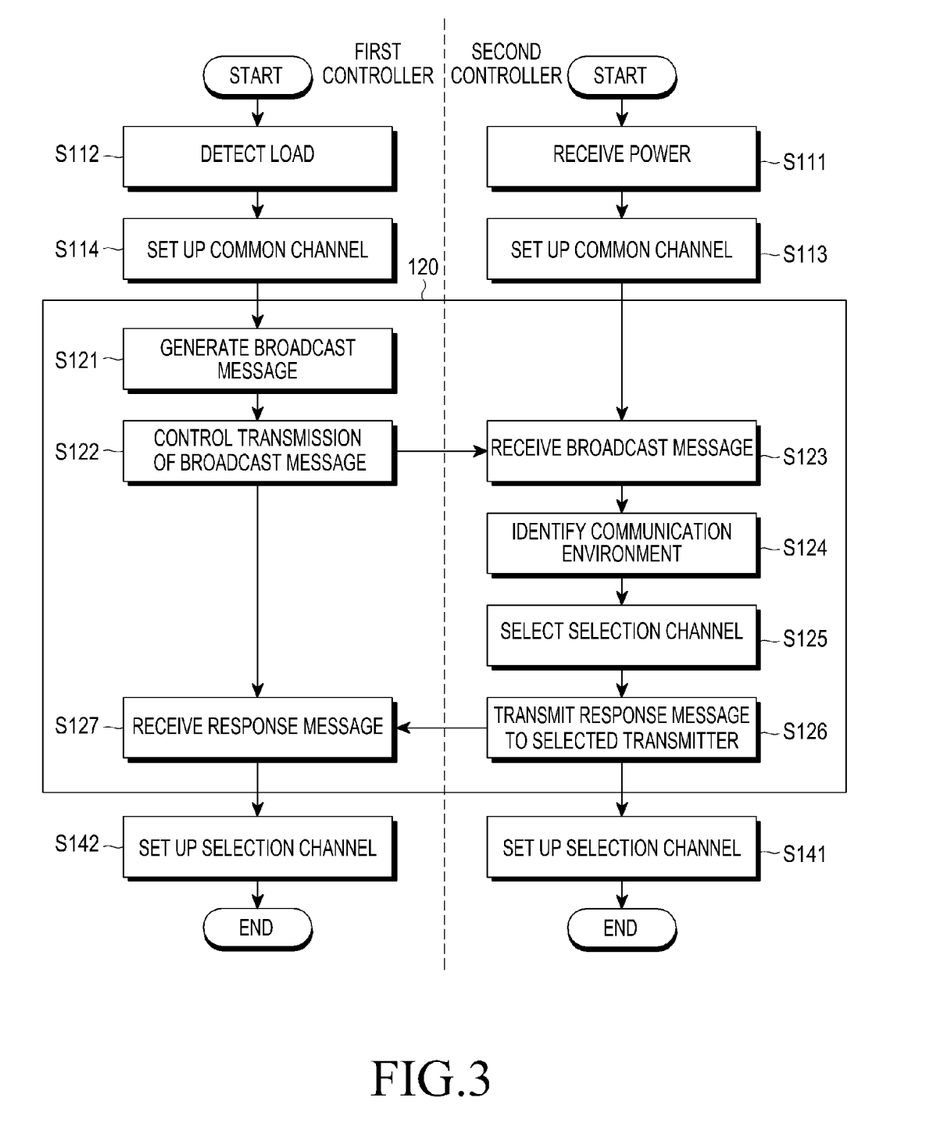
FIG. 3 is a flowchart illustrating a procedure of wireless recharging communication method, according to an embodiment of the present invention.

FIG. 3 is a flowchart illustrating a wireless recharging communication method according to an embodiment of the present invention. FIG. 4 is a diagram illustrating wireless power supplied by a transmitter that uses a wireless recharging communication method according to an embodiment of the present invention. FIG. 3 shows detailed operations of the first controller 170 included in the TX 100 and the second controller 260 included in the RX 200, which are divided into (a) and (b) parts performed by the first and second controllers 170 and 260, respectively.

Figure 4:
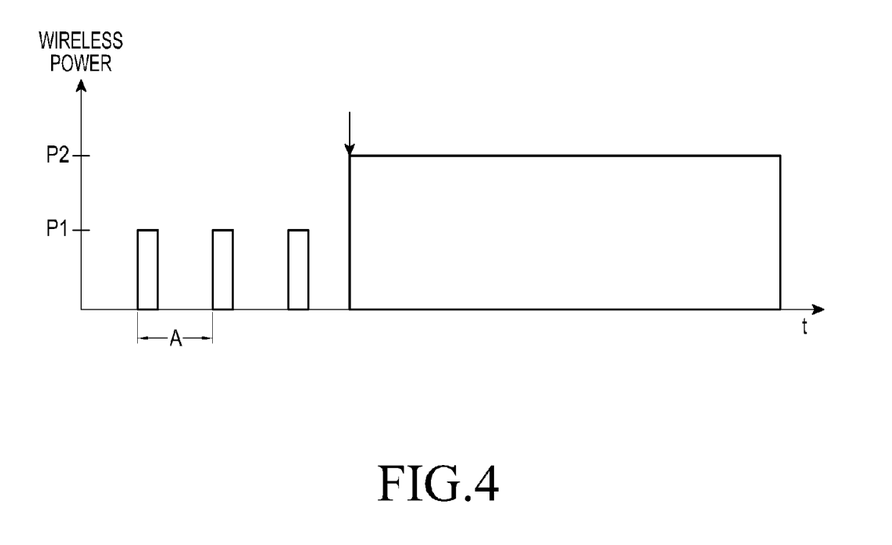
FIG. 4 is a diagram illustrating wireless power supplied by a power transmitter that uses the wireless recharging communication method according to an embodiment of the present invention.

Referring to FIG. 3, the TX 100 monitors a load across the first resonator 130 while periodically providing the first resonator 130 with low-powered pulses (P1 in FIG. 4) at a predetermined interval of time (A in FIG. 4).

If the RX 200 is located within a wireless rechargeable area covered by the TX 100, the second resonator 210 included in the RX 200 absorbs electromagnetic energy of the RF field generated by the first resonator 130, in step S111.

This absorption causes the load provided by the TX 100 to be changed, so the TX 100 detects that a rechargeable target (i.e., the RX 200) has entered the rechargeable area of the TX 100, in step S112. Upon detecting the RX 200, the first controller 170 of the TX 100 controls an increase of transmission power to a preset first power level (P2 in FIG. 4) to be supplied to the RX 200, to a power level sufficient for communication with the RX 200. According to an embodiment of the present invention, the first controller 170 increases the transmission power to the first power level P2 after detecting the first power receiver 200, in order to avoid unnecessary power consumption. However, as an alternative, the first controller 170 may initially transmit the power at the first power level P2, instead of performing monitoring.

The second controller 260 sets up a communication channel of the second communication unit 240 as the common channel, in step S113, and the first controller 170 simultaneously sets up a communication channel of the first communication unit 150 as the common channel, in step S114.

The first and second communication units 150 and 240 generate upward and downward data signals, exchange the generated data signals on the common channel, and determine which device is the target device for communication, and determine what channels are supported by the target device in consideration of strengths of the signals exchanged on the common channel, in step S120.

Specifically, the first controller 170 controls the first communication unit 150 to create a broadcast message for the selection channel, in step S121. The broadcast message includes an identifier of the TX 100 and information of the selection channel set up for the TX 100.

When the broadcast message is created, the first controller 170 controls the first communication unit 150 to broadcasts the broadcast message on the common channel, in step 122.

The second communication unit 240 included in the RX 200 receives the broadcast message transmitted on the common channel in step S123, and the second controller 240 identifies the communication environment (e.g., a Received Signal Strength Indicator (RSSI) value) in which the broadcast message is received, in step S124. Steps S123 and S124 may be performed for a predetermined time sufficient for the RX 200 to receive the broadcast message from the near-by TX 100, and the communication environment identified in step S124 may be temporarily stored for the predetermined time.

In step S125, the second controller 240 selects, from among the received broadcast messages, a broadcast message received in the best communication environment, checks information contained in the selected broadcast message (e.g., the identifier of the TX 100 and the information of the selection channel set up for the TX 100) in order to select the selection channel corresponding to the selected broadcast message, and transmits a response message to the corresponding TX 100.

In step S125, if there are TXs that have better communication environments than a predetermined threshold condition, the second controller 240 controls the second communication unit 240 to transmit messages for requesting respective selection channels from the TXs that have better communication environments than the predetermined threshold condition, in order to re-examine their communication environments. Upon receiving response messages, the second controller 240 determines a TX having the best communication environment and corresponding selection channel.

The first controller 170 checks the load change for a predetermined time, creates associated information (e.g., transmit load change information), and configures the broadcast message to additionally include the transmit load change information, in step S121. The second controller 240 checks a receive load change information from a load change value provided by the sensor unit 230 included in the RX 200, compares the transmit load change information included in the broadcast message and the receive load change information to determine the extent of their correspondence, and reflects the extent in determining the selection channel.

The second controller 240 controls the second communication unit 240 to transmit the response message to the TX 100 selected in S125 and controls the communication channel of the second communication unit 240 to be switched to the determined selection channel.

The first communication unit 150 of the selected TX 100 receives the response message and forwards the received response message to the first controller 170. The first controller 170 also controls the communication channel of the first communication unit 150 to be switched to the same selection channel, in step S142.

Figure 5:
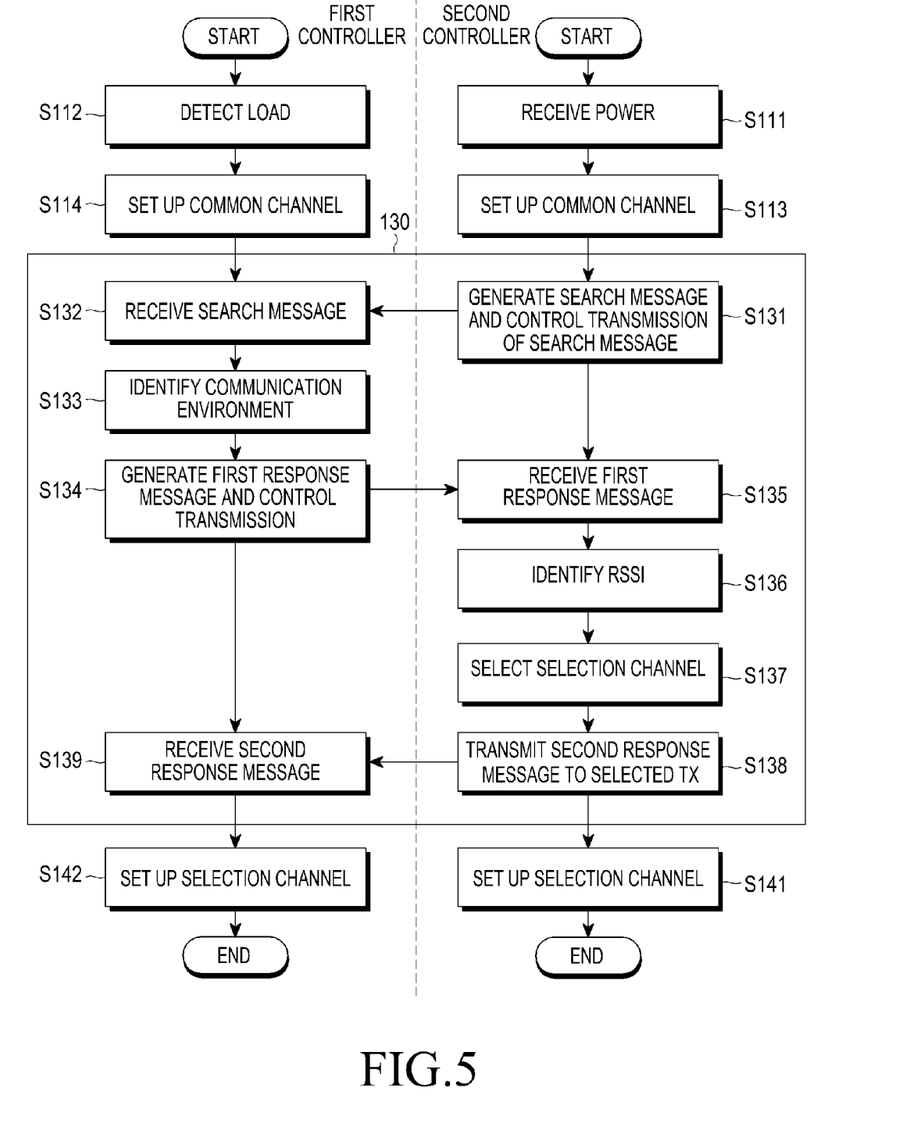
FIG. 5 is a flowchart illustrating operations of the wireless recharging communication method, according to another embodiment of the present invention.
Figure 6A:
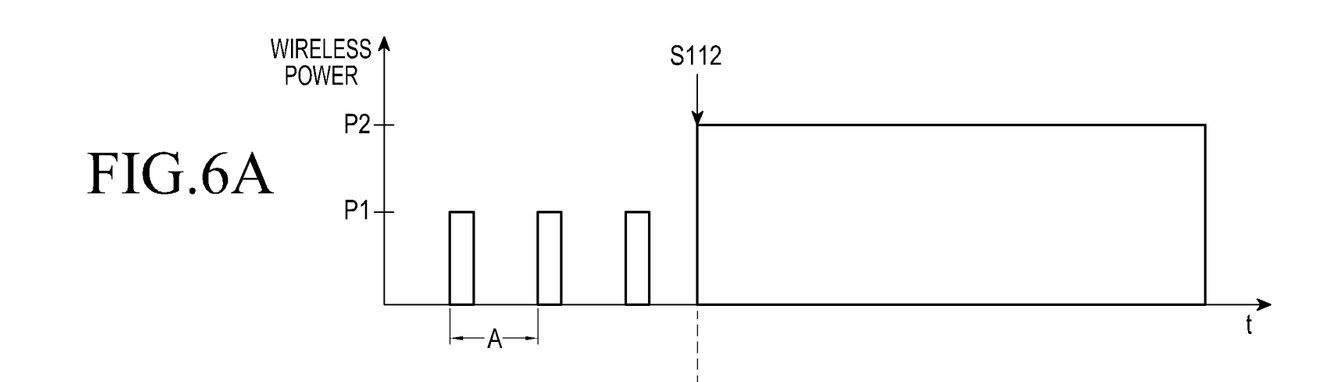
FIGS. 6A and 6B are diagrams illustrating transmission timings of search messages transmitted by the power receiver that uses the wireless recharging communication method according to an embodiment of the present invention.
Figure 6B:
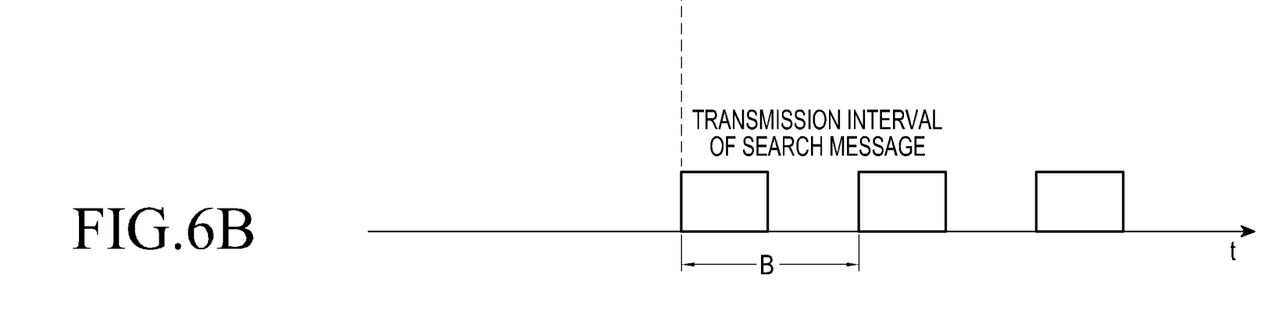

FIG. 5 is a flowchart illustrating a wireless recharging communication method according to another embodiment of the present invention. FIGS. 6A and 6B are diagrams illustrating transmission timing of search messages transmitted by a power receiver that uses the wireless recharging communication method according to an embodiment of the present invention.

In a manner similar to FIG. 3, FIG. 5 illustrates operations performed by the first controller 170 included in the TX 100 and the second controller 260 included in the RX 200.

The wireless recharging communication method according to FIG. 5 similar to the wireless recharging communication method of FIG. 3, except for some detailed operations in the procedure of determining the selection channel. More specifically, steps S111, S112, S113, S114, S141, and S142 are performed in the same manner as in the wireless recharging communication method of FIG. 3, but step S130 of FIG. 5 differs from FIG. 3.

Specifically, in step S131, the second controller 260 controls the second communication unit's 240 to create a search message to be broadcast and transmitted on the common channel, in order to search for the TX 100. The search message may include an identifier of the RX 200, and the transmission period (period B in FIG. 6B) of the search message may be set to be relatively greater than the period of the power pulses (period A in FIG. 6A) generated with load detection.

The first communication unit 150 included in the TX 100 receives the search message transmitted on the common channel in step S132, and the first controller 150 identifies the communication environment (e.g., an RSSI value) during the time in which the search message is received, in step S133. In step S134, the first controller 170 transmits a first response message on the common channel to respond to a search message satisfying a predetermined threshold from among received search messages. The first response message may include the identifier of the TX 100 and information of the selection channel set up for the TX 100.

The second communication unit 240 included in the RX 200 receives the first response message transmitted on the common channel in step S135, and the second controller 240 identifies the communication environment (e.g., an RSSI value) during a time in which the first response message is received, in step S136. Steps S135 and S136 may be performed for a predetermined time sufficient for the RX 200 to receive the first response message from the near-by TX 100, and the communication environment identified in step S136 may be temporarily stored for the predetermined time. In step S137, the second controller 240 selects, from among the received first response messages, a first response message received in the best communication environment, checks information contained in the selected first response message (e.g., the identifier of the TX 100 and the information of the selection channel set up for the TX 100), in order to select the selection channel corresponding to the selected first response message.

The first controller 170 checks the load change for a predetermined time, creates associated information (e.g., transmit load change information), and configures the first response message to include the transmit load change information, in step S134. Correspondingly, the second controller 240 checks a receive load change information from a load change value provided by the sensor unit 230 included in the RX 200, compares the transmit load change information included in the first response message and the receive load change information to determine the extent of their correspondence, and reflects the determined extent of correspondence in determining a selection channel.

The second controller 240 controls the second communication unit 240 to transmit a second response message to the TX 100 selected step in S138, and controls the communication channel of the second communication unit 240 to be switched to the determined selection channel.

The first communication unit 150 of the selected TX 100 receives the second response message and forwards the received response message to the first controller 170, which also controls the communication channel of the first communication unit 150 to be switched to the selection channel, in step 142.

According to embodiments of the present invention, in an environment where a plurality of wireless power transmitters exist, a wireless power receiver may quickly find and select one of the plurality of wireless power transmitters to power the wireless power receiver.

Furthermore, according to embodiments of the present invention, the wireless power transmitter and the wireless power receiver efficiently utilize limited communication resources.

Embodiments of the present invention may be implemented through hardware, software, or a combination thereof. The software may be stored as program instructions or computer readable codes executable by the processor on a computer-readable medium. Examples of a computer readable recording medium include magnetic storage media (e.g., ROM, floppy disks, hard disks, etc.), and optical recording media (e.g., Compact Disc (CD)-ROMs, or Digital Versatile Discs (DVDs)). Computer readable recording mediums can also be distributed over network coupled computer systems so that the computer readable code is stored and executed in a distributed fashion. This media can be read by the computer, stored in the memory, and executed by the processor. The memory included in the power transmitter or the power receiver may be utilized as computer readable recording mediums suitable for storing a program or programs having instructions that implement the embodiments of the present invention. The computer readable recording medium can also be distributed over network coupled computer systems so that the computer readable code is stored and executed in a distributed fashion.

Numerous modifications and adaptations to the above-described embodiments may be performed without departing from the spirit and scope of the present invention, as defined by the appended claims.

What is claimed is:

1. A method, of performing communication between a wireless power transmitter and a wireless power receiver, comprising:
   performing load detection by detecting wireless power provided by the wireless power transmitter being applied to the wireless power receiver;
   setting up a common channel having a predetermined first frequency for establishing a connection with the wireless power receiver, which is performed by the wireless power transmitter;
   establishing the connection with the wireless power receiver using the common channel;
   determining, from among available channels, a selection channel having an optimal condition for communicating with the wireless power receiver and a predetermined second frequency through use of the common channel; and
   performing data transmission and reception with the wireless power receiver through the selection channel,
   wherein determining the selection channel comprises:
      broadcasting, by the wireless power transmitter, a broadcast message including information for determining the wireless power receiver and the selection channel; and
      receiving, by the wireless power transmitter, from the wireless power receiver, a response indicating that the wireless power transmitter has optimal conditions for communicating with the wireless power receiver.

2. The method of claim 1, wherein the broadcast message includes an identifier of the wireless power transmitter and the selection channel supported by the wireless power transmitter.

3. The method of claim 1, wherein determining the selection channel comprises:
   receiving search messages having information for determining the wireless power receiver and the selection channel from a plurality of wireless power receivers;
   selecting a wireless power receiver having the optimal communication condition from among the plurality of wireless power receivers; and
   transmitting, to the selected wireless power receiver, a response indicating that the wireless power receiver has the optimal communication condition.

4. The method of claim 3, wherein the optimal communication condition is determined according to a communication environment in which the search message is received.

5. A method of communicating between a wireless power transmitter and a wireless power receiver, comprising:
   supplying wireless power received from the wireless power transmitter to the wireless power receiver;
   setting up a common channel having a predetermined first frequency for establishing a connection with the wireless power transmitter;
   establishing the connection with the wireless power transmitter using the common channel;
   determining, from among available channels, a selection channel having an optimal condition for communicating with the wireless power transmitter and a predetermined second frequency through use of the common channel; and
   performing data transmission and reception with the wireless power transmitter through the selection channel,
   wherein determining the selection channel comprises:
      receiving, by the wireless power receiver, through the common channel, a broadcast message from the wireless power transmitter having information for determining the wireless power receiver and the selection channel;
      selecting, from among a plurality of wireless power transmitters, a wireless power transmitter having an optimal condition for communication; and
      transmitting, in response to the broadcast message, a response message to the selected wireless power transmitter.

6. The method of claim 5, wherein the broadcast message includes an identifier of the wireless power transmitter and the selection channel supported by the wireless power transmitter.

7. The method of claim 5, wherein determining the selection channel comprises:
   transmitting, by the wireless power receiver, a search message having information for determining the wireless power receiver and the selection channel to at least one wireless power transmitter; and
   receiving, by the wireless power receiver, from the wireless power transmitter, a response message indicating the wireless power transmitter and the selection channel having the optimal condition for communication, which is determined by the wireless power transmitter.

8. The method of claim 7, wherein the optimal condition is determined according to a communication environment in which the search message is received.

9. A wireless power transmitter for wirelessly transmitting power, comprising:
   a power supply for supplying power;
   a resonator for creating a Radio Frequency (RF) field and wirelessly providing the supplied power through the RF field to a wireless receiver;
   a sensor unit for detecting a change in power provided by the resonator and informing a controller of whether the wireless power receiver is receiving the power;
   a communication unit for communicating with the wireless power receiver through a common channel having a predetermined first frequency and a selection channel having a predetermined second frequency; and
   the controller for controlling the communication unit to set up the common channel in response to a confirmation that the wireless power receiver is receiving the power, determining the selection channel using transmitted/received data on the common channel, and controlling the communication unit to set up the selection channel,
   wherein the controller provides, to the communication unit, information for determining the wireless power receiver and the selection channel, controls the communication unit to broadcast a message including the information for determining the wireless power receiver and the selection channel, checks a response received from the wireless power receiver, and configures the selection channel to communicate with the wireless power receiver.

10. The wireless power transmitter of claim 9, wherein the information for determining the wireless power receiver and the selection channel includes an identifier of the wireless power transmitter and the selection channel supported by the wireless power transmitter.

11. The wireless power transmitter of claim 9, wherein the controller checks a search message received from the communion unit that includes information for determining the wireless power receiver and the selection channel, determines, from among a plurality of wireless power receivers, a wireless power receiver having an optimal condition for communication, and controls the communication unit to transmit a response indicating that the determined wireless power receiver has the optimal condition for communication.

12. The wireless power transmitter of claim 11, wherein the optimal condition is determined according to a communication environment in which the search message is received.

13. A wireless power receiver for wirelessly receiving power, comprising:
a resonator for receiving a Radio Frequency (RF) field provided by a wireless power transmitter;
a power converter for converting the RF field received by the resonator into power useable by the wireless power receiver;
a communication unit for communicating with the wireless power transmitter through a common channel having a predetermined first frequency and a selection channel having a predetermined second frequency; and
a controller for controlling the communication unit to set up the common channel, determining the selection channel, using transmitted/received data on the common channel, and controlling setup of the selection channel,
wherein the controller selects, from among a plurality of wireless power transmitters, one of the wireless power transmitters having an optimal condition for communication, in response to receiving from each the plurality of wireless power transmitters, a broadcast message that includes information for determining the wireless power transmitter and the selection channel, and controls the communication unit to transmit a response message to the selected wireless power transmitter on the common channel in response to the broadcast message.

14. The wireless power receiver of claim 13, wherein information for determining the selected wireless power transmitter and the selection channel includes an identifier of the wireless power transmitter and the selection channel supported by the wireless power transmitter.

15. The wireless power receiver of claim 13, wherein the controller
generates a search message having information for determining the wireless power receiver and the selection channel, controls the communication unit to transmit the search message to the wireless power transmitter on the common channel, receives a response message indicating the wireless power receiver and a selection channel having the optimal condition for communication, which are determined by the wireless power transmitter, and controls the communication unit to set up the selection channel according to the received response message.

16. The wireless power receiver of claim 15, wherein the optimal condition is determined according to a communication environment in which the search message is received.

* * * * *